June 3, 1941.  W. S. ROLLINGS  2,244,218
ANTISKID CHAIN
Filed Jan. 15, 1940
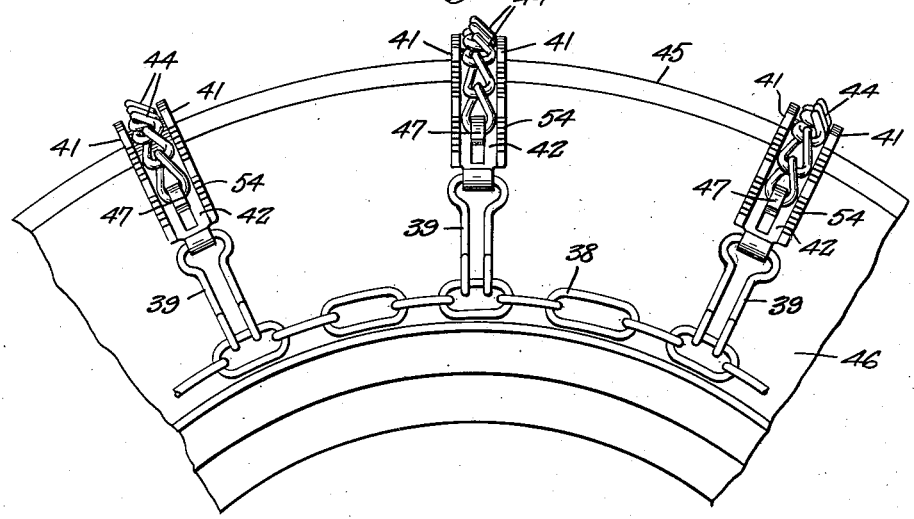
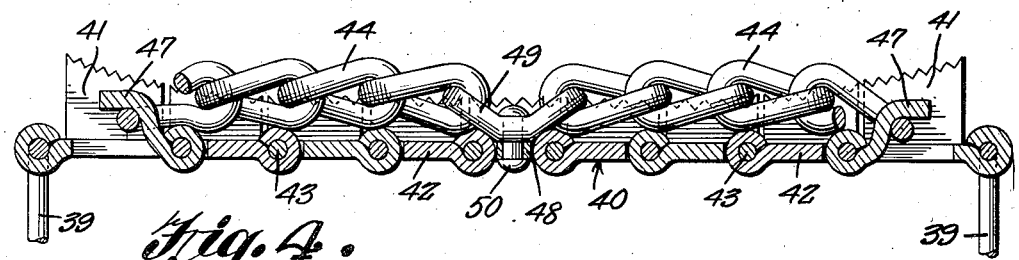
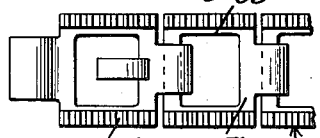
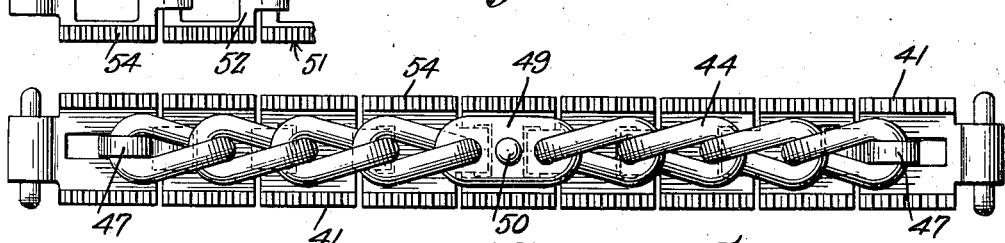
William S. Rollings, INVENTOR
By Victor J. Evans & Co.
ATTORNEYS
P. T. Hickey
WITNESS Patented June 3, 1941

2,244,218

UNITED STATES PATENT OFFICE 2,244,218

ANTISKID CHAIN

William S. Rollings, West Newton, Pa.

Application January 15, 1940, Serial No. 314,011

2 Claims. (Cl. 152—224)

This invention relates to anti-skid chains and has for an object to provide a channel skeleton bar for supporting a cross chain in such a manner that the cross chain will touch the tire and road and will at the same time not cause any more bump than conventional cross chains.

A further object is to provide channeled flexible link chain of U-shaped cross section to receive a conventional cross chain, the channel chain having hooks which hold the cross chain in operative position, the cross chain when broken slipping off of the hooks and falling to the road, thereby saving the fenders from mutilation.

A further object is to provide a skeleton bar and a flexible link chain of U-shaped cross section having saw teeth on the flanges which will have non-skid effect when the conventional cross chains have eliminated themselves and fallen to the road.

A further object is to provide a device of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification:

Figure 1 is a side elevation of a conventional anti-skid chain equipped with an anti-skid device formed of a channeled flexible link chain to receive the cross chain.

Figure 2 is a longitudinal sectional view of the flexible chain of channel formation and the conventional cross chain, shown in Figure 1.

Figure 3 is a plan view of the flexible channel chain and conventional cross chain held thereby.

Figure 4 is a fragmentary plan view of the flexible chain of channel formation, but showing the links of skeleton form instead of solid form as in Figures 2 and 3.

A form of the invention, suitable for attachment to conventional tire chains, which have circumferential chains 38 carrying cross links 39 for anchoring the cross chains, is shown. In this form of the invention a channeled flexible link chain 40 formed of U-shaped links, each having side flanges 41 and a web 42 pivotally connected to the web of the next adjacent link by pivot pin 43, is utilized for supporting the conventional cross chain 44 on the tread 45 of the tire 46.

The terminal links of the channeled link chain are provided with struck up outwardly opening hooks 47 which receive the terminal links of the cross chain 44. The innermost links of the cross chain are secured to the centermost link 48 of the channeled chain through the medium of a link 49 having its ends directed upwardly and interlocked with the adjacent links of the link chain. The link 49 is secured to the centermost link 48 of the channeled chain by a rivet 50. When the cross chain 44 becomes worn and breaks off at the link 49, the ends of the cross chain will be free and will slip off of the outwardly opening hooks 47 and drop to the road as previously described.

As shown in Figure 4, the flexible channel chain 51 is shown as provided with links 52 being cut away to provide large openings 53 so that the links are of skeleton form and permit the cross chain to project through the links and engage the tire.

In all forms of the invention the side flanges of the channeled chain are provided with teeth 54. The purpose of these teeth is to afford anti-friction means for gripping the road when cross chains become broken and are eliminated.

From the above description it is thought that the construction and operation of the invention will be fully understood without further explanation.

What is claimed is:

1. In anti-skid chains, a channel member adapted to extend transversely across the tread of a tire and comprising a plurality of links pivotally connected together, outwardly opening hooks on the terminal links of the channel member, and an anti-skid cross chain in the channel of the channel member connected at the ends to said hooks and adapted to drop off of said hooks when broken, said links of the channel member being cut away to provide large openings so that the links are of skeleton form and permit the cross chain to project through the links and engage the tire.

2. The structure as of claim 1 and in which the side flanges of the channel member are provided with teeth to afford anti-friction means for gripping the road when the cross chain becomes broken and is eliminated.

WILLIAM S. ROLLINGS.